Sept. 19, 1933.    I. HECHENBLEIKNER    1,927,493
CONVERTER
Filed Aug. 8, 1928
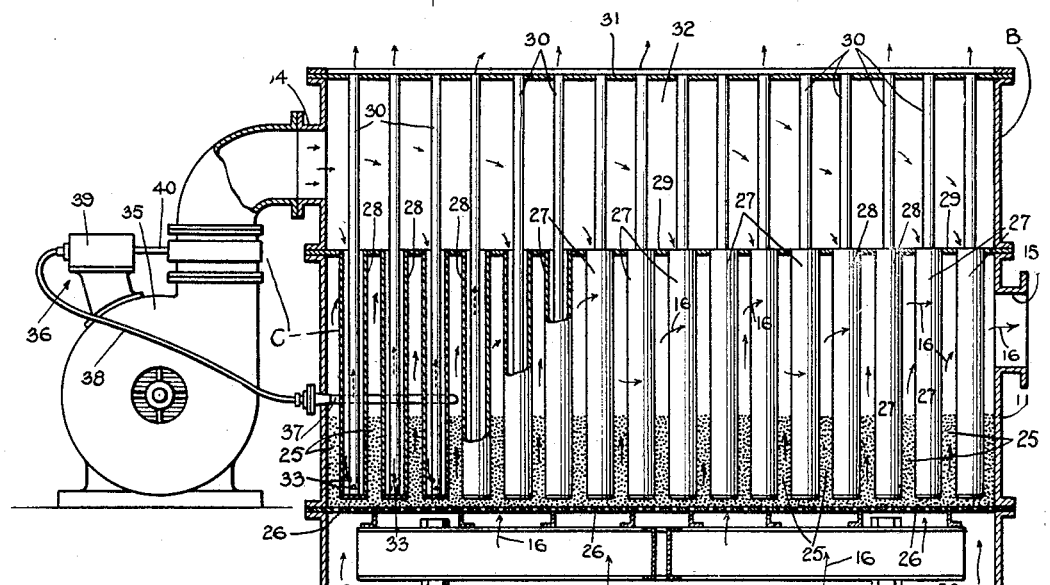
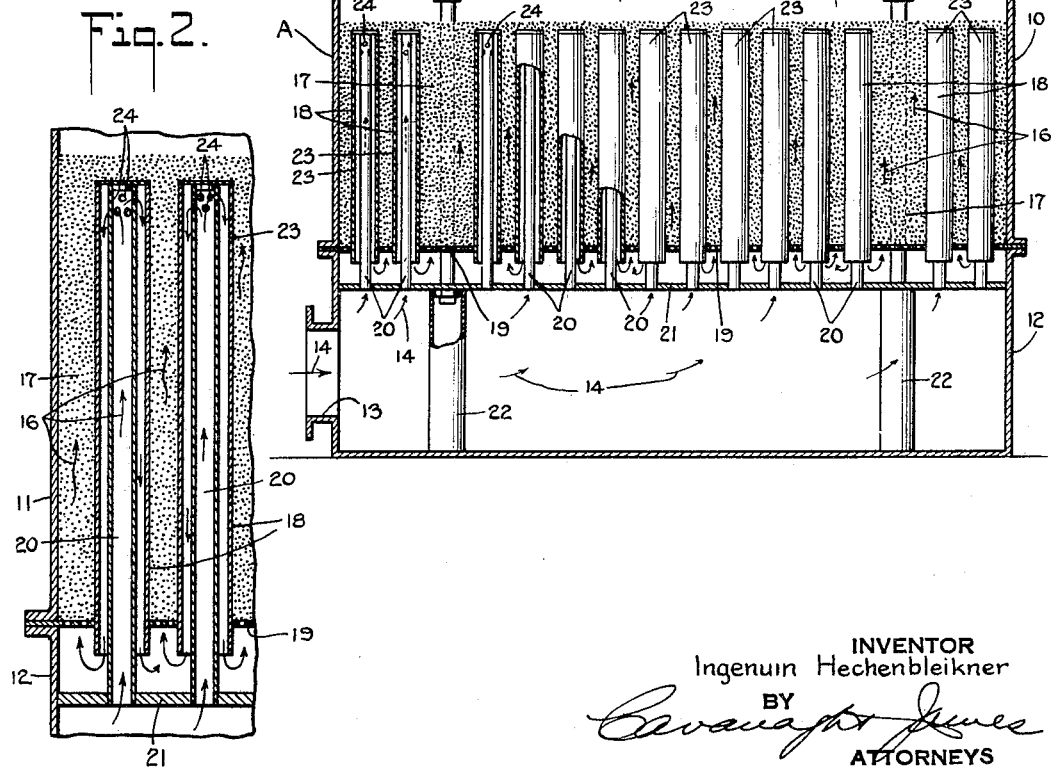
INVENTOR
Ingenuin Hechenbleikner
BY
ATTORNEYS Patented Sept. 19, 1933

1,927,493

UNITED STATES PATENT OFFICE 1,927,493

CONVERTER

Ingenuin Hechenbleikner, Charlotte, N. C., assignor, by mesne assignments, to Chemical Construction Corporation, a corporation of Delaware Application August 8, 1928. Serial No. 298,202

16 Claims. (Cl. 23—288)

This invention relates to a converter system or catalytic apparatus, and relates more particularly to a converter apparatus for carrying out catalytic reactions in the vapor phase; and has special reference to the provision of a converter system adapted especially for use in the catalytic oxidation of sulphur dioxide.

A prime desideratum of my present invention centers about the provision of improvements in converter systems of the type disclosed in the patent to A. O. Jaeger No. 1,660,511 of February 28, 1928, and in my copending application Serial No. 278,867, filed May 18, 1928. In catalytic apparatus of this type, particularly when employed for oxidizing sulphur dioxide in the contact method of producing sulphuric acid, it is requisite to keep the temperature under control not only in the catalyst mass which is subjected to the fresh gases, but also in the last catalyst layers which are required to effect the last percent of reaction. This is due to the fact that the catalytic reaction is relatively sensitive to temperature; and too high a temperature in the last catalyst layers results in a reversible reaction or reversion of the gases and hence in an incomplete oxidation process.

To control the temperature of reaction in the later stages of conversion, it has been suggested to separate the converter system into a converter of relatively large heat generating capacity, and one or more additional converters of lower heat generating capacity separated therefrom with heat exchangers interposed therebetween for cooling the gases flowing from the first or main converter where the greatest reaction takes place to the added converter or converters where the last few percent of reaction is effected. This suggested solution of the problem is, however, incomplete and only partially effective and results, moreover, in an undesired complication of the plant equipment employed. Although the first converter of the system is constructed as an automatic gas cooled apparatus especially designed to maintain uniform reaction temperatures, variations in the temperature of the gas flow leaving the first converter takes place, rendering it difficult to uniformly control the temperature of reaction in the added converter or converters of the series or system.

These temperature variations in the main or automatic gas cooled converter of the series are largely due to the lack of proportionality between the radiation properties of the converter and the changes in the gas flow through the converter; and for this reason, among others, the added converters are separated spacially from the main converter, this separation minimizing the exposure of the added catalyst layers to the full radiant heat of the highly heated catalyst mass in the main converter. This separation of the converters of the system results, however, in an undesired multiplication of equipment which incidentally renders the control of the temperature of the gases between the converters more difficult of accomplishment.

To obviate these difficulties while retaining the advantages incident to the use of a converter system of this type, I have provided, as set forth and claimed in my aforesaid copending application, a converter system in which the reaction temperatures of the added converter stage or stages, that is, the converter (or converters) of lower heat generating capacity are automatically controlled and preferably by the reaction heat of the converted gases, in such a way as to effect a uniform reaction temperature in the added or secondary converters. In my aforesaid application I accomplish this by providing a converter system having sections inter-related for effecting a temperature control of one converter governed by the temperature of the converter preceding the same in the series in such a way as to permit all of the converters of the system or series to be arranged in a single apparatus or structure instead of a plurality of separated structural units.

A prime desideratum of my present invention relates to an improved converter system of the type set forth in my copending application in which the primary and secondary converters of the series are organized into a single structural unit, the secondary converter or converter of less heat generating capacity being provided with a heat exchanging or cooling means controlled so as to uniformly regulate the reaction temperatures of the secondary converter, the control of said cooling means being governed by the temperatures within said second converter.

A further prime object of my present invention centers about the provision of a catalytic apparatus or converter particularly adapted for a converter of comparatively low heat generating capacity in which cooling gases other than the reaction gases are used for regulating the temperatures of the converter to maintain the same within uniform limits; the still further provision of a converter of this nature in which the cooling means is so organized as to act on the reaction gases discharging from the converter to cool the same so as to permit smaller coolers (usually employed in the process and arranged subsequent to the catalytic apparatus) than those ordinarily used to be employed in the process.

A still further prime object of the invention centers about the provision of a converter system particularly adapted for the oxidation of sulphur dioxide in which there are combined an internal heat exchange for the sulphur dioxide gases in the first converter of the series, an internal heat exchange for the converted gases and heat balancer in the second converter of the series, the two converters being organized for mechanical simplicity into one unit and the heat control in both converters being rendered self-regulating or automatic.

To the accomplishment of the foregoing and such other objects as will hereinafter appear, my invention consists in the elements and their relation one to the other, as hereinafter more particularly described and sought to be defined in the claims; reference being had to the accompanying drawing which shows the preferred embodiment of my present invention, and in which:

Fig. 1 is a vertical elevational diagrammatic view of the converter system of my present invention with parts broken away and other parts shown in section, and Fig. 2 is a fragmentary view thereof shown on an enlarged scale and in cross-section.

Referring now more in detail to the drawing, the improved converter system of my present invention comprises a first or main converter A of the automatic gas cooled type and a second or added converter B combined with the converter A into a single unit or structure, the said converter B being provided with an automatically controlled cooling means generally designated as C for regulating the reaction temperatures in the converter B, the said cooling means C being governed by the temperatures existing in the said second converter B.

The converter system A—B structurally comprises vertically stacked sections including a first converter chamber 10, a superposed second converter chamber 11, a bottom section 12 to which the first converter chamber 10 is secured, the said bottom section comprising a chamber for the entrant gases to be treated, such for example as SO$_2$ gases which enter at the opening 13 in said bottom section and which move in the directions indicated by the arrows 14, 14. The top converter section 11 is provided with an exit passage 15 for the reaction gases; and the two converter sections communicate with each other so that the gases flow through the converter chambers from bottom to top in the manner indicated by the arrows 16, 16 shown in the figure. These chamber sections are preferably made of steel framework secured together in the manner indicated in the drawing so as to permit removability of the various parts and replaceability of the sections.

The main converter A is preferably of the automatic gas cooled type and comprises a catalytic mass 17 through which the gases are forced after being pre-heated by heat exchanging elements 18, 18 arranged in the chamber 10. The catalyst mass 17 is supported on a gas permeable bottom 19; and the heat exchanging elements 18, 18 are embedded at least partially in the catalyst mass 17, each of said heat exchanging elements comprising an open-ended tube 20 fixed to an orificed plate 21 supported in the chamber 12 by pillars 22, 22 and passing upwardly into a tube 23 closed at its top and open at its bottom, each of the tubes 23 being fixed to the gas permeable bottom 19 and extending into the contact mass 17. The inner tubes 20, 20 are open at their top ends by means of orifices 24, 24 which provide communication between the said inner tubes 20 and outer tubes 23.

With this recited construction it will be understood that in entering the main converter the gases, after being thoroughly mixed and distributed in the chamber 12, move up through the inner tubes 20 out of direct heat exchanging relation with the catalyst, the gases after striking the top of these tubes being then caused to reverse their flow in the heat exchanging elements 18 and to move downwardly through the outer tubes 23 in direct heat exchanging contact with the catalyst mass 17, the gases being then deflected by the bottom plate 21 for movement into and through the catalyst mass 17, all as indicated by the arrows in the figure. This main converter A, due to the construction of the heat exchanging elements, possesses substantial cooling properties and effects an automatic cooling of the gases throughout a substantial range of gas velocities. By means of the construction provided, the gases issuing from the outer tubes 23 have free passage into the contact mass, the inversion of the tubes 23 preventing any dust sediment from the plant of the contact mass from stopping up the tubes and hence from interfering with the free movement of the reaction gases.

The secondary converter B comprises a catalyst mass 25 supported on a permeable partition or screen 26 which defines the communicating means between the two converter chambers; and preferably the level of the said mass 25 is arranged below the exit passage 15 of the converter.

As heretofore stated, it is essential, particularly in carrying out such exothermic reactions as are met with in the oxidation of sulphur dioxide, to control the reaction temperatures in the added converter within relatively narrow limits so that reversion effects are minimized and complete conversion is produced. Due, however, to a number of factors, including perhaps mainly the lack of proportionality between the radiation properties of the converter A and the variations of the gas velocity therethrough, the temperature in the converter A fluctuates, with the result that the temperature in the secondary converter B is undesirably non-uniform. Moreover, the converter B being arranged contiguous to the main converter A is exposed to the radiating heat of the highly heated catalyst mass in the converter A, this resulting in producing further uncontrolled variations in the temperature of the secondary converters. As an example of the desired temperature control, it may be stated that with the apparatus thus far disclosed, the temperature of the reaction gases entering the converter B is about 820° to 850° F., whereas it is desired that the temperature of these entering gases be cooled to about 775° F. The converter B builds up about 50° F. so that the desirable temperature of reaction in the converter is about 825° F., whereas the operation temperature may undesirably run to higher limits. To effect maximum conversion and to prevent reversion, the reaction temperatures in the converter B should be kept more closely to and within narrow limits of the desired temperatures specified.

I have discovered that the desired and uniform temperature control may be effected by the provision of heat exchanging means arranged in the converter B, and the control of said heat exchanging means automatically by the temperatures existing in the said converter B. I have further found that this may be effectively accomplished by means of cooling gases other than the reaction gases used in the process, and that the cooling means may be organized so as to stabilize not only the conversion temperatures in the secondary converter, but so as to effect an additional cooling of the converted gases prior to their discharging from the exit passage 15 of the secondary converter; and by such an arrangement it is possible to decrease the size of coolers customarily used in the process which are ordinarily arranged subsequent to the catalytic apparatus in the process.

These results I accomplish by the provision of the gas cooling means C which comprises a plurality of heat exchanging elements 27, 27 similar in construction to the heat exchanging elements 18 but designed for employment with a cooling medium other than the reaction gases, each of said heat exchanging elements 27 comprising an outer tube 28 fixed to an apertured plate 29, and an inner tube 30 fixed to and hung from a top apertured plate 31, the said plates 29 and 31 being spaced to define therebetween a chamber 32. The inner tubes 30 are open at their tops and bottoms, the bottom opening being defined by a plurality of apertures 33 opening into the bottom closed end of the outer tubes 28, which outer tubes are open at their tops for communication with the aforesaid chamber 32. The chamber 32 is provided with an entrant opening 34 which communicates with an air blower apparatus 35. These tubes defining the heat exchanging elements are at least partially embedded in the catalyst mass 25, as clearly shown in the drawing, the level of the mass being such as to provide a free space for the reaction gases between the level of the catalyst mass 25 and the exit passage 15 for the reaction gases.

For effecting the desired regulation of the temperature in the secondary converter B, cooling air is circulated through the heat exchanging elements 27, and this cooling air (or other gaseous medium) has the first effect of cooling the contact mass 25 and the consequent effect of decreasing the temperatures of reaction in the second converter B. To maintain the temperatures in the converter B uniform within desired limits, I provide means for regulating the velocity of flow or circulation of the air or other cooling medium through the heat exchanging elements 27, the said means being governed by the temperatures in the converter B and comprising a temperature regulator generally designated as 36 and including a regulator bulb 37 extending into the chamber 11 preferably above the catalyst mass therein and connected by means of the flexible conduit 38 to a head 39 of the regulator, the said head having a construction similar to that described in my aforesaid copending application and which may comprise any means well known to the art for controlling the opening or closing of a damper or valve 40 arranged in the air passage of the blower 35. With this construction any change in the temperature in the converter B above or below the point at which the regulator is set is immediately transmitted to the regulator and operates the valve or damper 40, thereby varying the flow of the cooling air or gases, the operation being such that the reaction temperatures in the secondary converter are maintained uniform within the desired narrow limits.

From an inspection of Fig. 1 of the drawing it will be seen that the cooling air or other medium coming from the blower 35 first enters the top chamber 32 where the same is distributed to the various heat exchanging elements 27, and the cooling air first moves in one direction through the outer tubes 28 into direct heat exchanging contact with the gases and catalyst mass and then moves in the reverse direction out of heat exchanging contact with the mass or the gases through the inner tubes 30 issuing from the top orificed plate 31, all as indicated by the arrows in the figure. Thus the coolest part of the cooling medium first contacts the fully converted gases aiding in cooling the same to a degree sufficient to permit the use of smaller subsequent coolers for the SO₃ gases, and then functions for cooling the contact mass 25. The automatic cooling apparatus for the secondary converter therefore acts as an internal heat exchange for the SO₃ gases and as a heat balancer.

The use and operation of the improved converter system of my present invention and the advantages thereof will in the main be fully apparent from the above detailed description thereof. It will further be apparent that while I have shown and described my invention in the preferred form, many changes and modifications may be made in the structure disclosed without departing from the spirit of the invention, defined in the following claims.

What is claimed is:

1. A converter system comprising a first converter of large heat generating capacity provided with a catalyst and with automatic cooling means for controlling the converter temperatures, a second converter of lower heat generating capacity also provided with a catalyst and connected in cascade to the exit end of the first converter, and means responsive to and automatically controlled by the temperatures due to the reactions in one of said converters for regulating the converter temperatures of said second converter in order to keep the same within predetermined desirable limits.

2. A converter system comprising a first converter of large heat generating capacity provided with a catalyst and with automatic cooling means for controlling the converter temperatures, a second converter of lower heat generating capacity also provided with a catalyst and connected in cascade to the exit end of the first converter, and means responsive to the temperatures of said second converter for regulating the converter temperatures of said second converter in order to keep the same within predetermined desirable limits.

3. A converter system comprising a first converter of large heat generating capacity provided with a catalyst mass and with automatic cooling means for controlling the converter temperatures, a second converter of lower heat generating capacity also provided with a catalyst mass and connected in cascade to the exit end of the first converter, and means for supplying a cooling medium other than and independent of the reaction gases for cooling the catalyst mass of said second converter in order to regulate the converter temperatures of said second converter.

4. A converter system comprising a first converter of large heat generating capacity provided with a catalyst and with automatic cooling means for controlling the converter temperatures, a second converter of lower heat generating capacity also provided with a catalyst and connected in cascade to the exit end of the first converter, means to circulate a cooling medium different from and independent of the reaction gases, and cooling means connected to said circulating means and arranged in said second converter for cooling the catalyst therein in order to regulate the converter temperatures of said second converter.

5. A converter system comprising a first converter of large heat generating capacity provided with a catalyst and with cooling means for controlling the converter temperatures therein, a second converter of lower heat generating capacity also provided with a catalyst and connected in cascade to the exit end of the first converter, an independent source of gaseous cooling medium, cooling means connected to said source and arranged in said second converter, and means controlled by the temperature generated in the second of said converters for governing the operation of the gas cooling means to regulate the converter temperatures of said second converter.

6. A converter system including at least two converter sections, an automatic gas cooled converter in the first of said sections including a catalyst mass, heat exchanging elements at least partially embedded in the catalyst mass, means for causing reaction gases to circulate through the heat exchanging elements out of direct heat exchanging relation with the catalyst, means for causing the gases to reverse their flow in the heat exchanging elements and pass in reverse flow through portions of the elements in direct heat exchanging contact with the catalyst, and means for deflecting gases issuing from the heat exchanging elements through said catalyst mass; a converter of lower heat generating capacity in the second of said sections, means for causing the reaction gases issuing from the automatic gas cooled converter to flow through said second converter, catalytic mass cooling means arranged in said second converter, and means controlled by variation in the temperature in the second converter for oppositely governing the operation of said catalytic mass cooling means so as to regulate the temperature of conversion of said second converter.

7. A converter system comprising a converter subdivided into at least two stacked converter chambers, an automatic gas cooled converter in the first of said chambers including a catalyst mass, heat exchanging elements at least partially embedded in the catalyst mass, means for causing reaction gases to circulate through the heat exchanging elements out of direct heat exchanging relation with the catalyst, means for causing the gases to reverse their flow in the heat exchanging elements and pass in reverse flow through portions of the elements in direct heat exchanging contact with the catalyst, and means for deflecting gases issuing from the heat exchanging elements through said catalyst mass; a converter of lower heat generating capacity in the second of said chambers, means for causing the reaction gases issuing from the automatic gas cooled converter to flow through said second converter, catalytic mass cooling means arranged in said second converter, and means controlled by variation in temperature of the reaction gases in said second converter for oppositely governing the operation of said catalytic mass cooling means so as to regulate the temperature of conversion of said second converter.

8. A converter system comprising at least two converter sections, an automatic gas cooled converter in the first of said sections including a catalyst mass, heat exchanging elements at least partially embedded in the catalyst mass, means for causing reaction gases to circulate through the heat exchanging elements out of direct heat exchanging relation with the catalyst, means for causing the gases to reverse their flow in the heat exchanging elements and pass in reverse flow through portions of the elements in direct heat exchanging contact with the catalyst, and means for deflecting gases issuing from the heat exchanging elements through said catalyst mass; a converter of lower heat generating capacity in the second of said sections, means for causing the reaction gases issuing from the automatic gas cooled converter to flow through said second converter, catalytic mass cooling means arranged in said second converter, said catalytic mass cooling means comprising heat exchanging and heat balancing elements at least partially embedded in the mass of the second converter, and means for causing cooling gases other than and independent of said reaction gases to circulate through said last mentioned elements.

9. In combination with the converter system of claim 8, means responsive to changes in the temperature in the second converter for regulating the cooling gas circulation in the heat exchange elements of the second converter, in order to regulate the temperature of the second converter.

10. A converter comprising a converter chamber having entrant and exit passages for the reaction gases, a catalyst mass in said chamber through which the gases circulate; and cooling means arranged in said converter chamber comprising heat exchanging elements at least partially embedded in the catalyst mass, means for causing gases independent of said reaction gases to circulate through said last mentioned elements, and means governed by the temperatures in said converter chamber for regulating the operation of said cooling means.

11. A converter comprising a converter chamber having entrant and exit passages for the reaction gases, a catalyst mass in said chamber through which the reaction gases circulate; and catalyst mass cooling means arranged in said converter chamber comprising heat exchanging elements at least partially embedded in the catalyst mass, means for causing gases independent of said reaction gases to circulate through said heat exchanging elements in one direction in direct heat exchanging relation with the catalyst and in the reverse direction out of heat exchanging relation with said catalyst, and means for governing the rate of circulation of said gases through said elements.

12. A converter comprising a converter chamber having entrant and exit passages for the reaction gases, a catalyst mass in said chamber through which the reaction gases circulate; and catalyst mass cooling means arranged in said converter chamber comprising heat exchanging elements at least partially embedded in the catalyst mass, means for causing gases independent of said reaction gases to circulate through said heat exchanging elements in one direction in direct heat exchanging relation with the catalyst and in the reverse direction out of heat exchanging relation with said catalyst, and means controlled by the reaction temperatures of said converter for governing the rate of circulation of said gases through said elements.

13. A converter comprising a converter chamber having entrant and exit passages for the reaction gases, a catalyst mass in said chamber through which the gases circulate; and cooling means arranged in said converter chamber comprising heat exchanging elements at least partially embedded in the catalyst mass, means for causing cooling air to circulate through said last mentioned elements, and means responsive to the temperature in the converter for automatically governing the circulation of said cooling air.

14. A converter system comprising a converter subdivided into at least two converter sections, an automatic gas cooled converter in the first of said sections including a catalyst mass, heat exchanging elements at least partially embedded in the catalyst mass, means for causing reaction gases to circulate through the heat exchanging elements out of direct heat exchanging relation with the catalyst, means for causing the gases to reverse their flow in the heat exchanging elements and pass in reverse flow through portions of the elements in direct heat exchanging contact with the catalyst, and means for deflecting gases issuing from the heat exchanging elements through said catalyst mass; a converter of lower heat generating capacity in the second of said sections, means for causing the reaction gases issuing from the automatic gas cooled converter to flow through said second converter, catalytic mass cooling means arranged in said second converter comprising heat exchanging elements at least partially embedded in the catalyst mass of the second converter, means for causing cooling gases other than and independent of said reaction gases to circulate through said heat exchanging elements in one direction in direct heat exchanging relation with the catalyst and in the reverse direction out of heat exchanging relation with said catalyst, and temperature responsive means for automatically governing the rate of circulation of said gases through said elements.

15. A converter comprising a converter chamber having a bottom entrant and a top exit passage for upward flow of the reaction gases, a catalyst mass in said chamber through which the gases circulate, cooling means arranged in said converter chamber comprising heat exchanging elements extending downwardly from the top of the chamber and at least partially embedded in the catalyst mass, and means for causing cooling gases other than and independent of said reaction gases to circulate through said last mentioned elements, the said chamber being provided with a free space above the level of the catalyst mass wherein the reaction gases issuing from the mass are cooled by said elements prior to discharging from the exit passage.

16. A converter comprising a converter chamber having entrant and exit passages for the reaction gases, a catalyst mass in said chamber through which the reaction gases circulate; and catalyst mass cooling means arranged in said converter chamber comprising heat exchanging elements at least partially embedded in the catalyst mass, means for causing gases independent of said reaction gases to circulate through said heat exchanging elements first in direct heat exchanging relation with the catalyst and then out of heat exchanging relation with said catalyst, the said chamber having a free gas space between the level of the catalyst mass and the exit passage and said elements extending in said free gas space.

INGENUIN HECHENBLEIKNER.